US012591323B2

(12) United States Patent
Wu et al.

(10) Patent No.: US 12,591,323 B2
(45) Date of Patent: Mar. 31, 2026

(54) DEVICE AND METHOD FOR DETECTION

(71) Applicant: HTC Corporation, Taoyuan City (TW)

(72) Inventors: Chun-Yih Wu, Taoyuan City (TW);
Ta-Chun Pu, Taoyuan City (TW);
Yen-Liang Kuo, Taoyuan City (TW)

(73) Assignee: HTC Corporation, Taoyuan City (TW)

( * ) Notice: Subject to any disclaimer, the term of this
patent is extended or adjusted under 35
U.S.C. 154(b) by 0 days.

(21) Appl. No.: 18/903,286

(22) Filed: Oct. 1, 2024

(65) Prior Publication Data

US 2026/0064212 A1 Mar. 5, 2026

(30) Foreign Application Priority Data

Aug. 29, 2024 (TW) ................................. 113132563

(51) Int. Cl.
*G06F 3/038* (2013.01)
*G06F 3/044* (2006.01)

(52) U.S. Cl.
CPC .......... *G06F 3/0383* (2013.01); *G06F 3/0446*
(2019.05)

(58) Field of Classification Search
CPC .............................. G06F 3/0383; G06F 3/0446
See application file for complete search history.

(56) References Cited

U.S. PATENT DOCUMENTS 9,965,983 B2 * 5/2018 Mathews .............. G06F 3/0446
2015/0360647 A1 * 12/2015 Mathews .............. G06F 3/0445
345/174

FOREIGN PATENT DOCUMENTS

CN 205427875 U * 8/2016
TW 201213946 A * 4/2012 ........... G06F 3/0418
TW 201416991 A * 5/2014

OTHER PUBLICATIONS

Machine translation of TW-201416991-A. (Year: 2025).*
Machine translation of CN-205427875-U. (Year: 2025).*
Machine translation of TW-201213946-A. (Year: 2025).*

* cited by examiner

*Primary Examiner* — Michael Pervan
(74) *Attorney, Agent, or Firm* — Birch, Stewart, Kolasch
& Birch, LLP

(57) ABSTRACT

A detection device for detecting a human body portion
includes a plastic element, a substrate, a plurality of metal
pieces, a ground plane, a multiplexer, and an HBC (Human
Body Communication) transceiver. The substrate has a first
surface and a second surface which are opposite to each
other. The metal pieces are disposed on the first surface of
the substrate. The metal pieces are adjacent to each other.
The ground plane is disposed on the second surface of the
substrate. The plastic element covers the metal pieces. The
metal pieces are configured to capacitively couple to a
plurality of electric field signals through the plastic element.
The multiplexer generates a selection signal according to the
electric field signals. The HBC transceiver receives the
selection signal.

19 Claims, 6 Drawing Sheets

<u>100</u>

550

560

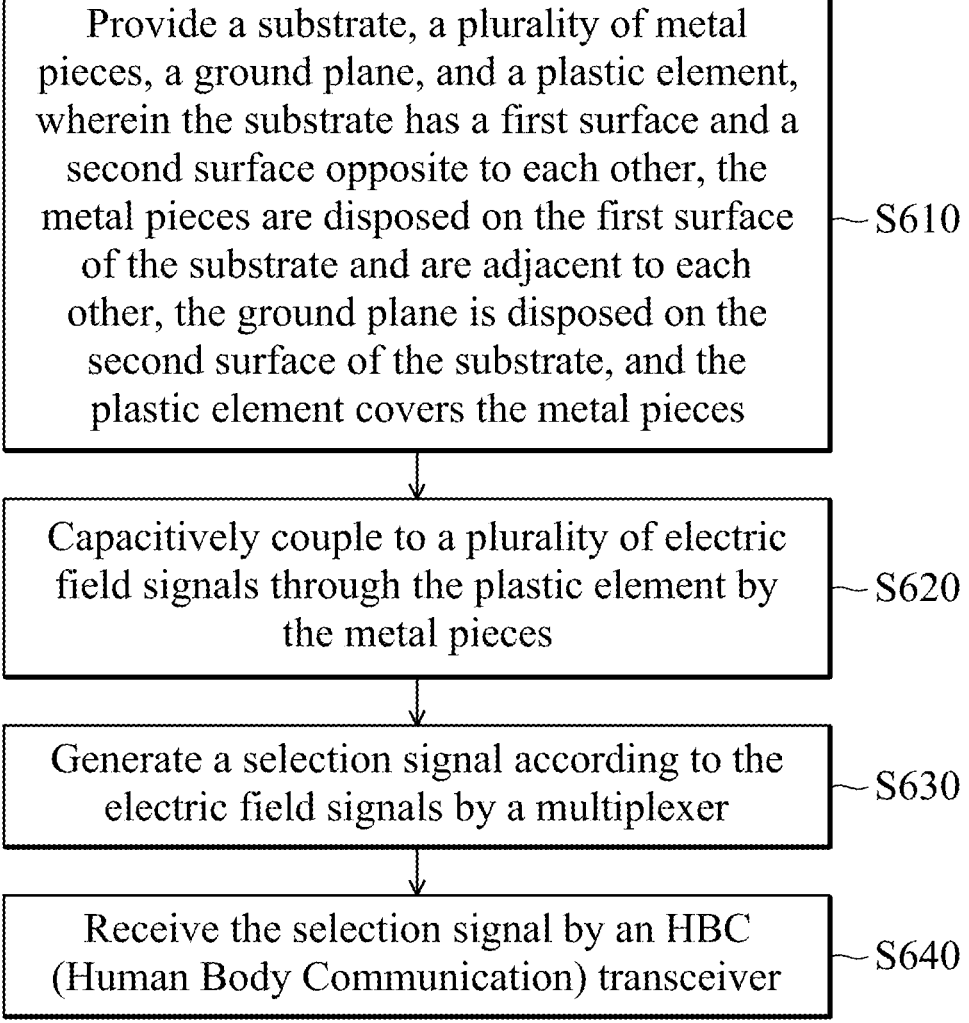

Provide a substrate, a plurality of metal pieces, a ground plane, and a plastic element, wherein the substrate has a first surface and a second surface opposite to each other, the metal pieces are disposed on the first surface of the substrate and are adjacent to each other, the ground plane is disposed on the second surface of the substrate, and the plastic element covers the metal pieces —S610

Capacitively couple to a plurality of electric field signals through the plastic element by the metal pieces —S620

Generate a selection signal according to the electric field signals by a multiplexer —S630

Receive the selection signal by an HBC (Human Body Communication) transceiver —S640

FIG. 6

DEVICE AND METHOD FOR DETECTION

CROSS REFERENCE TO RELATED APPLICATIONS

This application claims priority of Taiwan Patent Application No. 113132563 filed on Aug. 29, 2024, the entirety of which is incorporated by reference herein.

BACKGROUND OF THE INVENTION

Field of the Invention

The invention relates to a detection device, and more particularly, to a detection device and a detection method.

Description of the Related Art

The applications of conventional sensing elements in the fields of VR (Virtual Reality) and AR (Augmented Reality) are limited. This may degrade their overall detection accuracy. Accordingly, there is a need to propose a novel solution for solving the problems of the prior art.

BRIEF SUMMARY OF THE INVENTION

In an exemplary embodiment, the invention is directed to a detection device for detecting a human body portion. The detection device includes a plastic element, a substrate, a plurality of metal pieces, a ground plane, a multiplexer, and an HBC (Human Body Communication) transceiver. The substrate has a first surface and a second surface which are opposite to each other. The metal pieces are disposed on the first surface of the substrate. The metal pieces are adjacent to each other. The ground plane is disposed on the second surface of the substrate. The plastic element covers the metal pieces. The metal pieces are configured to capacitively couple to a plurality of electric field signals through the plastic element. The multiplexer generates a selection signal according to the electric field signals. The HBC transceiver receives the selection signal.

In some embodiments, the length of each of the metal pieces is from 1 mm to 5 mm.

In some embodiments, the distance between any adjacent two of the metal pieces is from 1 mm to 10 mm.

In some embodiments, the thickness of the substrate is smaller than or equal to 1 mm.

In some embodiments, the plastic element is made of a conductive plastic material.

In some embodiments, the dielectric constant of the plastic element is greater than or equal to 2.

In some embodiments, the plastic element is configured to adjust the field distribution of the electric field signals.

In some embodiments, the plastic element is substantially planar.

In some embodiments, the plastic element has a plurality of openings which are adjacent to each other.

In some embodiments, the openings of the plastic element are periodically arranged.

In some embodiments, the openings of the plastic element are substantially aligned with the metal pieces, respectively.

In some embodiments, the openings of the plastic element are interleaved with the metal pieces.

In some embodiments, the length of each of the openings of the plastic element is from 1 mm to 5 mm.

In some embodiments, the width of each of the openings of the plastic element is from 1 mm to 5 mm.

In some embodiments, the distance between any adjacent two of the openings of the plastic element is from 1 mm to 5 mm.

In some embodiments, the thickness of the plastic element is smaller than or equal to 1 mm.

In some embodiments, the plastic element includes a plurality of cylindrical portions which are adjacent to each other.

In some embodiments, the cylindrical portions of the plastic element are periodically arranged.

In some embodiments, the plastic element is substantially spherical.

In another exemplary embodiment, the invention is directed to a detection method that includes the steps of: providing a substrate, a plurality of metal pieces, a ground plane, and a plastic element, wherein the substrate has a first surface and a second surface opposite to each other, the metal pieces are disposed on the first surface of the substrate and are adjacent to each other, the ground plane is disposed on the second surface of the substrate, and the plastic element covers the metal pieces; capacitively coupling to a plurality of electric field signals through the plastic element by the metal pieces; generating a selection signal according to the electric field signals by a multiplexer; and receiving the selection signal by an HBC (Human Body Communication) transceiver.

BRIEF DESCRIPTION OF DRAWINGS

The invention can be more fully understood by reading the subsequent detailed description and examples with references made to the accompanying drawings, wherein:

FIG. 6 is a flowchart of a detection method according to an embodiment of the invention.

DETAILED DESCRIPTION OF THE INVENTION

Figure 1:
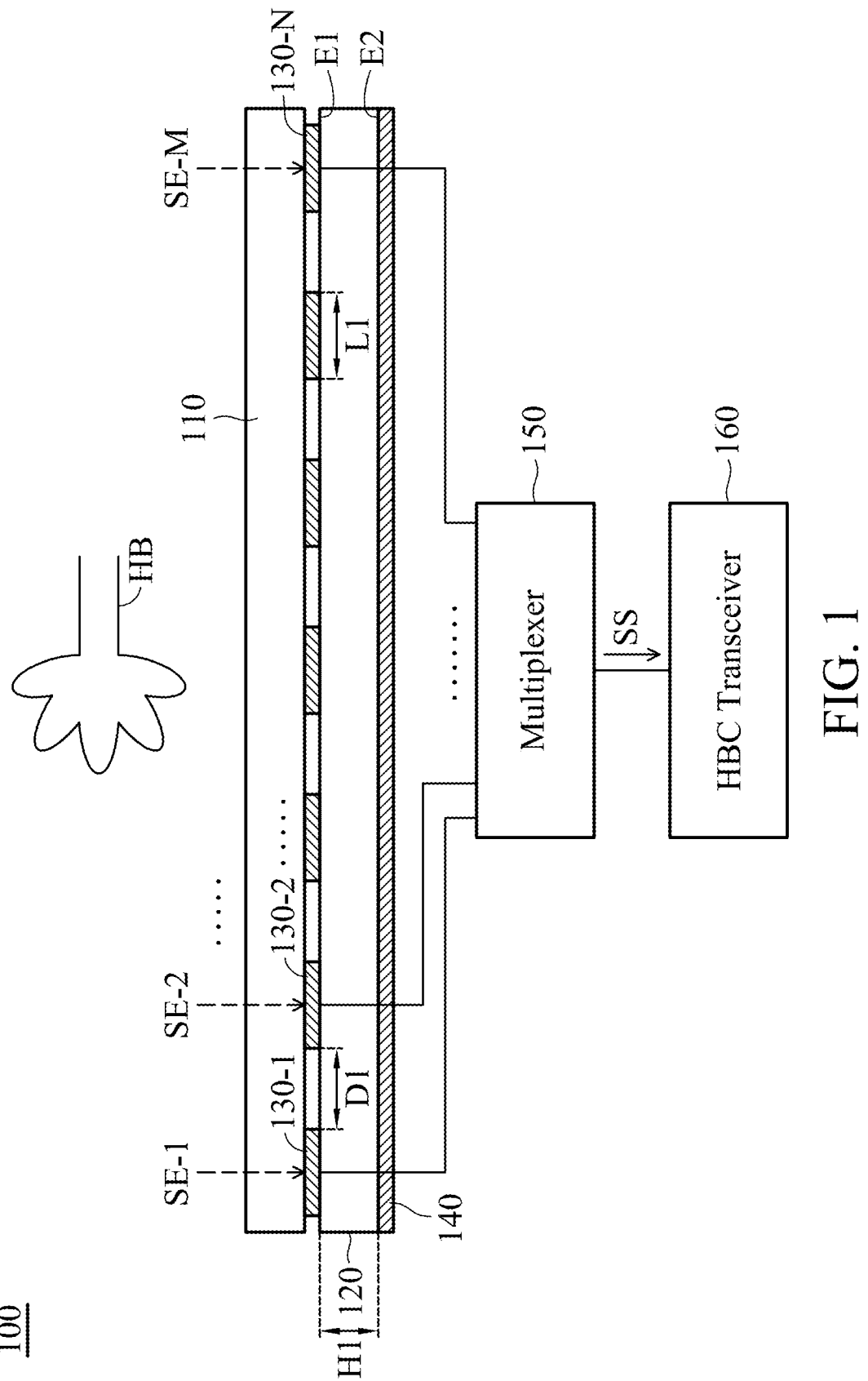
FIG. 1 is a diagram of a detection device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 according to an embodiment of the invention. For example, the detection device 100 may be applied to the field of VR (Virtual Reality) or AR (Augmented Reality), but it is not limited thereto. In the embodiment of FIG. 1, the detection device 100 includes a plastic element 110, a substrate 120, a plurality of metal pieces 130-1, 130-2, . . . , and 130-N, a ground plane 140, a multiplexer 150, and an HBC (Human Body Communication) transceiver 160, where "N" is any integer greater than or equal to 2. It should be understood that the detection device 100 may further include other components, such as a battery, a housing, a speaker, and/or a power supply module, although they are not displayed in FIG. 1.

In some embodiments, the detection device 100 is configured to detect a human body portion HB. For example, the human body portion HB may be a finger or a palm of a user, but it is not limited thereto.

The substrate 120 has a first surface E1 and a second surface E2 which are opposite to each other. For example, the substrate 120 may be implemented with an FPC (Flexible Printed Circuit), an FR4 (Flame Retardant 4) substrate, or a PCB (Printed Circuit Board), but it is not limited thereto.

The metal pieces 130-1, 130-2, . . . , and 130-N are disposed on the first surface E1 of the substrate 120. The metal pieces 130-1, 130-2, . . . , and 130-N are disposed adjacent to each other. For example, each of the metal pieces 130-1, 130-2, . . . , and 130-N may substantially have a rectangular shape, a square shape, a circular shape, or an elliptical shape. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/ spacing between them is reduced to 0).

The ground plane 140 may be made of a metal material, and it may be disposed on the second surface E2 of the substrate 120. It should be understood that the shapes of the metal pieces 130-1, 130-2, . . . , and 130-N and the ground plane 140 are not limited in the invention.

The plastic element 110 is configured to cover the metal pieces 130-1, 130-2, . . . , and 130-N. For example, the plastic element 110 may directly touch the metal pieces 130-1, 130-2, . . . , and 130-N. Alternatively, the plastic element 110 may be merely adjacent to the metal pieces 130-1, 130-2, . . . , and 130-N, but it may not directly touch the metal pieces 130-1, 130-2, . . . , and 130-N. In addition, the metal pieces 130-1, 130-2, . . . , and 130-N are configured to capacitively couple to a plurality of electric field signals SE-1, SE-2, . . . , and SE-M through the plastic element 110, where "M" is any integer greater than or equal to 2. In some embodiments, the electric field signals SE-1, SE-2, . . . , and SE-M are naturally generated by the human body portion HB and include any information relative to the human body portion HB, but they are not limited thereto.

The multiplexer 150 is coupled to the metal pieces 130-1, 130-2, . . . , and 130-N. The connection lines therebetween may not touch the ground plane 140. The multiplexer 150 generates a selection signal SS according to the electric field signals SE-1, SE-2, . . . , and SE-M. For example, the selection signal SS may include the information of any one or more of the electric field signals SE-1, SE-2, . . . , and SE-M, but it is not limited thereto. Next, the HBC transceiver 160 receives the selection signal SS. In some embodiments, based on the selection signal SS, the HBC transceiver 160 or a processor coupled thereto (not shown) performs a positioning process on the human body portion HB, or collects a variety of physiological information of the human body portion HB. For example, the operational frequency of the HBC transceiver 160 may be from 10 MHz to 100 MHz.

With the design of the invention, the plastic element 110 is configured to adjust the field distribution of the electric field signals SE-1, SE-2, . . . , and SE-M, thereby improving the overall detection performance. According to practical measurements, the proposed detection device 100 of the invention can significantly increase both its detection sensitivity and detection accuracy.

In some embodiments, the element sizes of the detection device 100 will be described as follows. The thickness H1 of the substrate 120 may be smaller than or equal to 1 mm. The length L1 of each of the metal pieces 130-1, 130-2, . . . , and 130-N may be from 1 mm to 5 mm. The distance D1 between any adjacent two of the metal pieces 130-1, 130-2, . . . , and 130-N may be from 1 mm to 10 mm. The above ranges of element sizes are calculated and obtained according to many experimental results, and they help to optimize the detection sensitivity and detection accuracy of the detection device 100.

The following embodiments will introduce different configurations and detail the structural features of the detection device 100. It should be understood that these figures and descriptions are merely exemplary, rather than limitations of the invention.

Figure 2A:
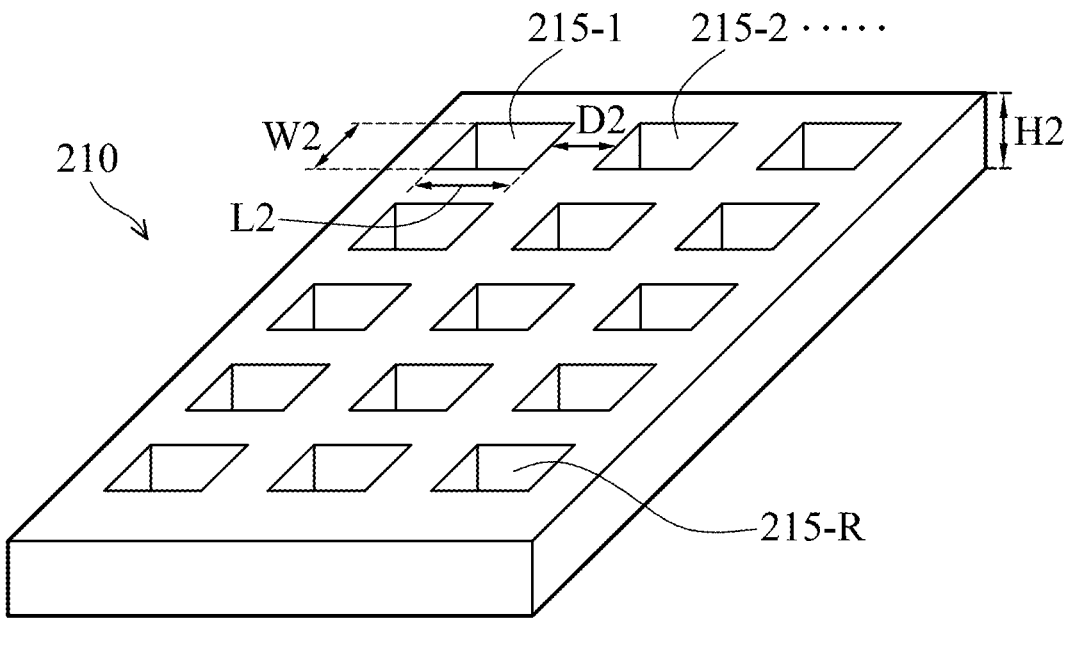
FIG. 2A is a perspective view of a plastic element according to an embodiment of the invention.

FIG. 2A is a perspective view of a plastic element 210 according to an embodiment of the invention. It should be noted that the plastic element 210 may also be applied to the detection device 100 of FIG. 1. In the embodiment of FIG. 2A, the plastic element 210 is made of a conductive plastic material, and the dielectric constant of the plastic element 210 is greater than or equal to 2. According to practical measurements, the application of the conductive plastic material can further modify the field distribution of the electric field signals SE-1, SE-2, . . . , and SE-M. However, the invention is not limited thereto. In alternative embodiments, the plastic element 210 is made of a nonconductive plastic material.

The plastic element 210 may be substantially planar, such as a rectangular plate. Specifically, the plastic element 210 has a plurality of openings 215-1, 215-2, . . . , and 215-R which are adjacent to each other, where "R" is any integer greater than or equal to 2. For example, each of the openings 215-1, 215-2, . . . , and 215-R of the plastic element 210 may substantially have a rectangular shape, a square shape, a circular shape, or an elliptical shape, but it is not limited thereto. In some embodiments, the openings 215-1, 215-2, . . . , and 215-R of the plastic element 210 are periodically arranged.

Figure 2B:
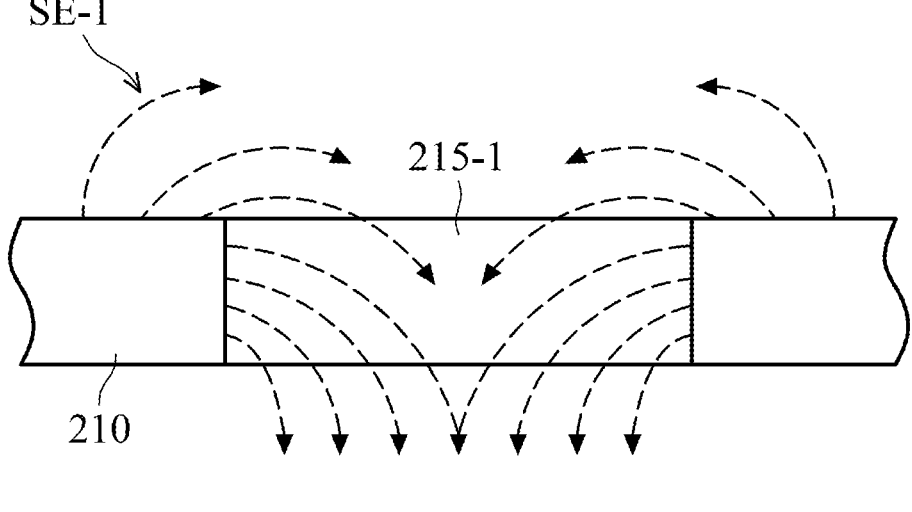
FIG. 2B is a partial sectional view of a plastic element according to an embodiment of the invention.

FIG. 2B is a partial sectional view of the plastic element 210 according to an embodiment of the invention. According to the measurement of FIG. 2B, if the electric field signal SE-1 is adjacent to the opening 215-1 of the plastic element 210, the field distribution of the electric field signal SE-1 will be significantly changed (as indicated by a plurality of arrows of FIG. 2B), thereby increasing the corresponding detection sensitivity. Similarly, the other electric field signals SE-2, . . . , and SE-M can be affected by the plastic element 210 and its corresponding openings, and they will not be illustrated again herein.

Figure 2C:
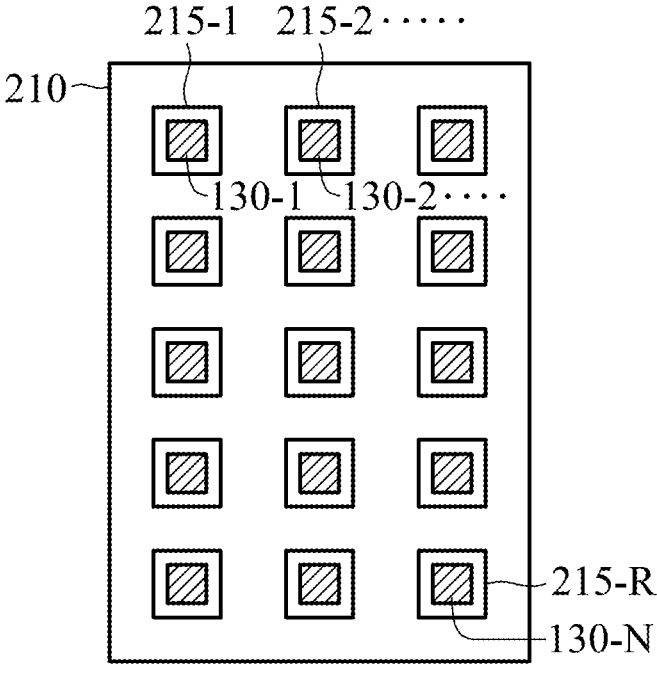
FIG. 2C is a top view of a plastic element according to an embodiment of the invention.

FIG. 2C is a top view of the plastic element 210 according to an embodiment of the invention. In the embodiment of FIG. 2C, the openings 215-1, 215-2, . . . , and 215-R of the plastic element 210 are substantially aligned with the metal pieces 130-1, 130-2, . . . , and 130-N of the detection device 100, respectively. In other words, the metal pieces 130-1, 130-2, . . . , and 130-N have a plurality of vertical projections on the plastic element 210, and these vertical projections are positioned inside the openings 215-1, 215-2, . . . , and 215-R of the plastic element 210, respectively. In alternative embodiments, the total number of metal pieces 130-1, 130-2, . . . , and 130-N is smaller than the total number of openings 215-1, 215-2, . . . , and 215-R (i.e., N<R).

Figure 2D:
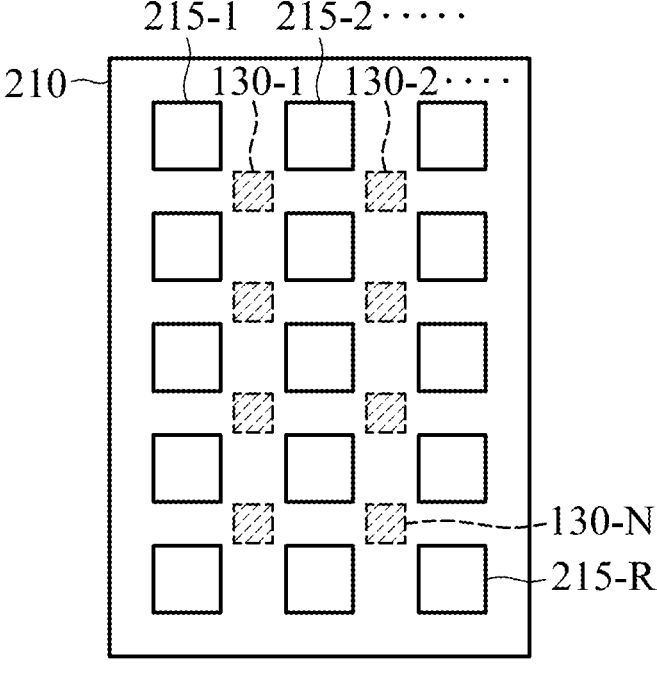
FIG. 2D is a top view of a plastic element according to an embodiment of the invention.

FIG. 2D is a top view of the plastic element 210 according to an embodiment of the invention. In the embodiment of FIG. 2D, the openings 215-1, 215-2, . . . , and 215-R of the plastic element 210 are interleaved with the metal pieces 130-1, 130-2, . . . , and 130-N. In other words, the metal pieces 130-1, 130-2, . . . , and 130-N have a plurality of vertical projections on the plastic element 210, and these vertical projections do not overlap the openings 215-1, 215-2, . . . , and 215-R of the plastic element 210 at all. However, the invention is not limited thereto. In alternative embodiments, the vertical projections of the metal pieces 130-1, 130-2, . . . , and 130-N merely partially overlap the openings 215-1, 215-2, . . . , and 215-R of the plastic element 210.

In some embodiments, the element sizes of the plastic element 210 will be described as follows. The thickness H2 of the plastic element 210 may be smaller than or equal to 1 mm. The length L2 of each of the openings 215-1, 215-2, . . . , and 215-R of the plastic element 210 may be from 1 mm to 5 mm. The width W2 of each of the openings 215-1, 215-2, . . . , and 215-R of the plastic element 210 may be from 1 mm to 5 mm. The distance D2 between any adjacent two of the openings 215-1, 215-2, . . . , and 215-R of the plastic element 210 may be from 1 mm to 5 mm. The above ranges of element sizes are calculated and obtained according to many experimental results, and they help to optimize the detection sensitivity and detection accuracy of the detection device 100.

Figure 3:
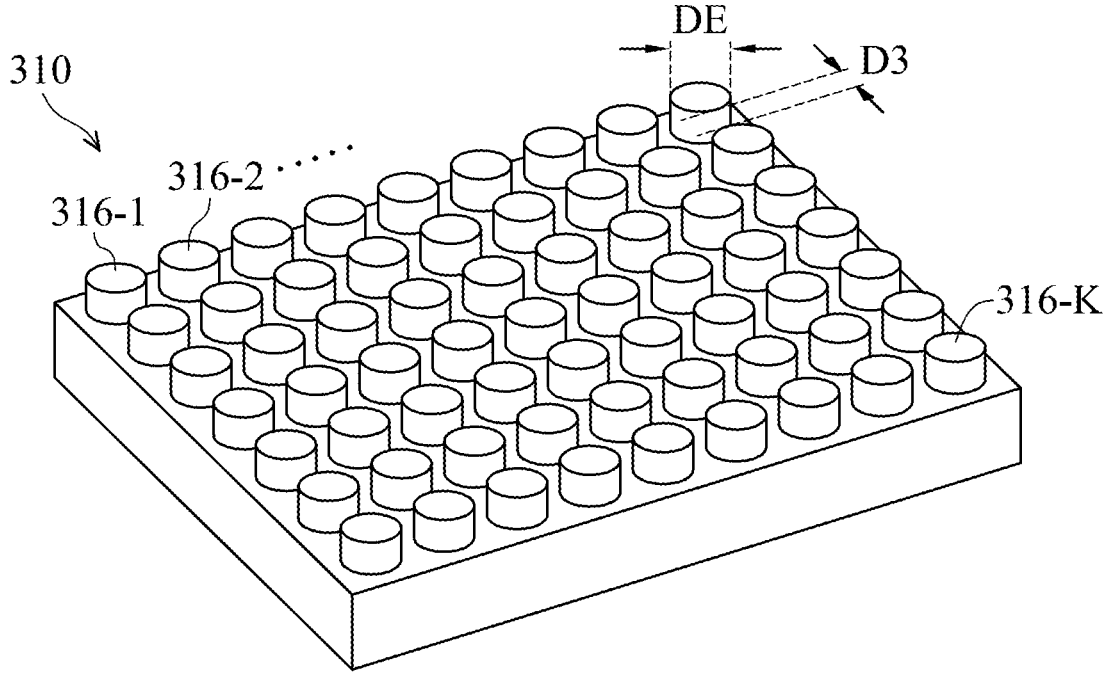
FIG. 3 is a perspective view of a plastic element according to an embodiment of the invention.

FIG. 3 is a perspective view of a plastic element 310 according to an embodiment of the invention. It should be noted that the plastic element 310 may also be applied in the detection device 100 of FIG. 1. In the embodiment of FIG. 3, the plastic element 310 includes a plurality of cylindrical portions 316-1, 316-2, . . . , and 316-K which are adjacent to each other, where "K" is any integer greater than or equal to 10. Specifically, the cylindrical portions 316-1, 316-2, . . . , and 316-K of the plastic element 310 may be periodically arranged. For example, the diameter DE of each of the cylindrical portions 316-1, 316-2, . . . , and 316-K of the plastic element 310 may be from 1 mm to 3 mm, and the distance D3 between any adjacent two of the cylindrical portions 316-1, 316-2, . . . , and 316-K of the plastic element 310 may be from 1 mm to 5 mm. According to practical measurements, the cylindrical portions 316-1, 316-2, . . . , and 316-K of the plastic element 310 and their gaps can also modify the field distribution of the electric field signals SE-1, SE-2, . . . , and SE-M.

Figure 4:
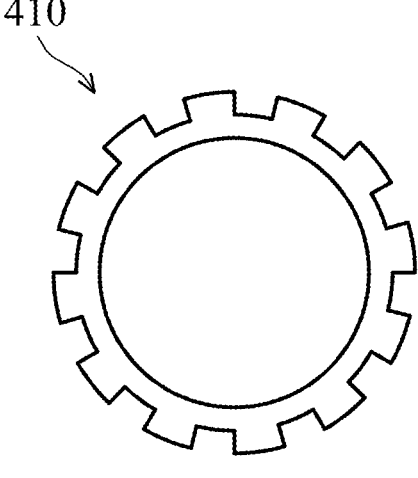
FIG. 4 is a sectional view of a plastic element according to an embodiment of the invention.

FIG. 4 is a sectional view of a plastic element 410 according to an embodiment of the invention. It should be noted that the plastic element 410 may also be applied to the detection device 100 of FIG. 1. In the embodiment of FIG. 4, the plastic element 410 is substantially spherical, and it provides similar performance.

Figure 5A:
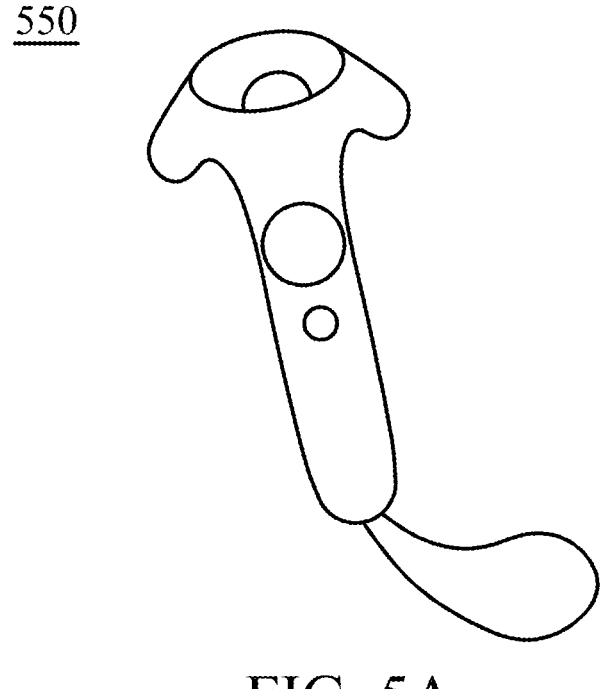
FIG. 5A is a diagram of a gaming controller according to an embodiment of the invention.
Figure 5B:
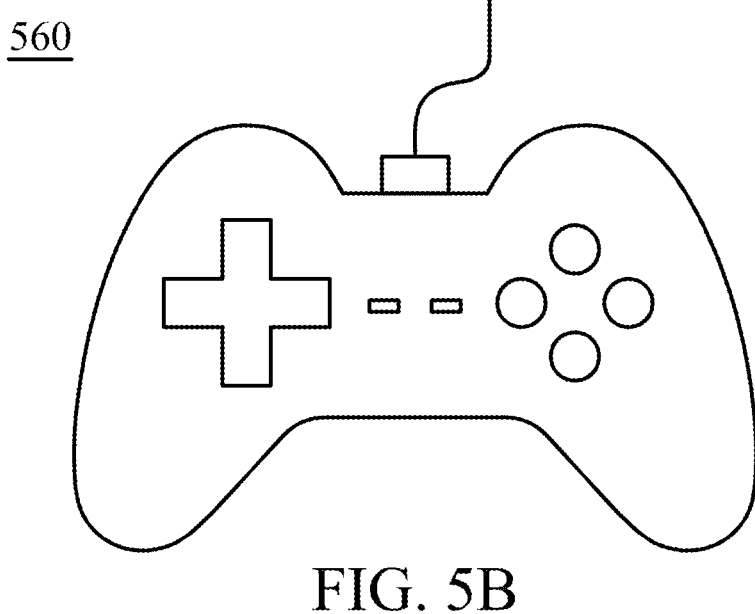
FIG. 5B is a diagram of a gaming joystick according to an embodiment of the invention.

FIG. 5A is a diagram of a gaming controller 550 according to an embodiment of the invention. FIG. 5B is a diagram of a gaming joystick 560 according to an embodiment of the invention. In the embodiment of FIG. 5A and FIG. 5B, the aforementioned detection device 100 is applied in the gaming controller 550 or the gaming joystick 560, so as to communicate with a target human body portion by using an HBC mechanism.

FIG. 6 is a flowchart of a detection method according to an embodiment of the invention. To begin, in step S610, a substrate, a plurality of metal pieces, a ground plane, and a plastic element are provided. The substrate has a first surface and a second surface which are opposite to each other. The metal pieces are disposed on the first surface of the substrate and are adjacent to each other. The ground plane is disposed on the second surface of the substrate. The plastic element covers the metal pieces. In step S620, a plurality of electric field signals are capacitively coupled through the plastic element by the metal pieces. In step S630, a selection signal is generated according to the electric field signals by a multiplexer. Finally, in step 640, the selection signal is received by an HBC transceiver. It should be understood that these steps are not required to be performed in order, and every feature of the embodiments of FIGS. 1 to 5 may be applied to the detection method of FIG. 6.

The invention proposed a novel detection device and a novel detection method. In comparison to the conventional design, the invention has at least the advantages of improving both the overall detection sensitivity and the overall detection accuracy. Therefore, the invention is suitable for application in a variety of devices.

Note that the above element parameters are not limitations of the invention. A designer can fine-tune these setting values according to different requirements. It should be understood that the detection device and detection method of the invention are not limited to the configurations of FIGS. 1-6. The invention may include any one or more features of any one or more embodiments of FIGS. 1-6. In other words, not all of the features displayed in the figures should be implemented in the detection device and detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A detection device for detecting a human body portion, comprising:
    a substrate, having a first surface and a second surface opposite to each other;
    a plurality of metal pieces, disposed on the first surface of the substrate, wherein the metal pieces are adjacent to each other;
    a ground plane, disposed on the second surface of the substrate;
    a plastic element, covering the metal pieces, wherein the metal pieces are configured to capacitively couple to a plurality of electric field signals through the plastic element;
    a multiplexer, generating a selection signal according to the electric field signals; and
    an HBC (Human Body Communication) transceiver, receiving the selection signal;
    wherein the plastic element is configured to adjust a field distribution of the electric field signals.

2. The detection device as claimed in claim 1, wherein a length of each of the metal pieces is from 1 mm to 5 mm.

3. The detection device as claimed in claim 1, wherein a distance between any adjacent two of the metal pieces is from 1 mm to 10 mm.

4. The detection device as claimed in claim 1, wherein a thickness of the substrate is smaller than or equal to 1 mm.

5. The detection device as claimed in claim 1, wherein the plastic element is made of a conductive plastic material.

6. The detection device as claimed in claim 1, wherein a dielectric constant of the plastic element is greater than or equal to 2.

7. The detection device as claimed in claim 1, wherein the plastic element is substantially planar.

8. The detection device as claimed in claim 1, wherein the plastic element has a plurality of openings adjacent to each other.

9. The detection device as claimed in claim 8, wherein the openings of the plastic element are periodically arranged.

10. The detection device as claimed in claim 8, wherein the openings of the plastic element are substantially aligned with the metal pieces, respectively.

11. The detection device as claimed in claim 8, wherein the openings of the plastic element are interleaved with the metal pieces.

12. The detection device as claimed in claim 8, wherein a length of each of the openings of the plastic element is from 1 mm to 5 mm.

13. The detection device as claimed in claim 8, wherein a width of each of the openings of the plastic element is from 1 mm to 5 mm.

14. The detection device as claimed in claim 8, wherein a distance between any adjacent two of the openings of the plastic element is from 1 mm to 5 mm.

15. The detection device as claimed in claim 1, wherein a thickness of the plastic element is smaller than or equal to 1 mm.

16. The detection device as claimed in claim 1, wherein the plastic element comprises a plurality of cylindrical portions adjacent to each other.

17. The detection device as claimed in claim 16, wherein the cylindrical portions of the plastic element are periodically arranged.

18. The detection device as claimed in claim 1, wherein the plastic element is substantially spherical.

19. A detection method, comprising the steps of:
    providing a substrate, a plurality of metal pieces, a ground plane, and a plastic element, wherein the substrate has a first surface and a second surface opposite to each other, the metal pieces are disposed on the first surface of the substrate and are adjacent to each other, the ground plane is disposed on the second surface of the substrate, and the plastic element covers the metal pieces;
    capacitively coupling to a plurality of electric field signals through the plastic element by the metal pieces;
    generating a selection signal according to the electric field signals by a multiplexer;
    receiving the selection signal by an HBC (Human Body Communication) transceiver; and
    adjusting a field distribution of the electric field signals by the plastic element.

* * * * *